US00RE40616E

(19) United States
(12) Reissued Patent
Nixon et al.

(10) Patent Number: US RE40,616 E
(45) Date of Reissued Patent: Jan. 6, 2009

(54) PORT SECURITY BARRIER SYSTEM

(75) Inventors: Laurence G. Nixon, Port Hueneme, CA (US); Robert J. Taylor, Camarillo, CA (US); William Seelig, Rockville, MD (US); Stephen Blair Slaughter, Costa Mesa, CA (US)

(73) Assignee: The United States of America as represented by the Secretary of the Navy, Washington, DC (US)

(21) Appl. No.: 10/828,533

(22) Filed: Apr. 15, 2004

Related U.S. Patent Documents

Reissue of:
(64) Patent No.: 6,681,709
Issued: Jan. 27, 2004
Appl. No.: 10/390,404
Filed: Mar. 12, 2003

(51) Int. Cl.
*B63G 9/04* (2006.01)

(52) U.S. Cl. ..... 114/241; 114/240 C; 114/240 E

(58) Field of Classification Search ..... 114/240 C, 114/240 D, 240 E, 240 R, 241, 267
See application file for complete search history.

(56) References Cited

U.S. PATENT DOCUMENTS

| | | | | | |
|---|---|---|---|---|---|
| 1,151,607 | A | * | 8/1915 | Newhall, Jr. et al. | 114/241 |
| 1,204,547 | A | * | 11/1916 | Corrado et al. | 114/241 |
| 1,249,107 | A | * | 12/1917 | Johnson | 114/241 |
| 1,353,811 | A | * | 9/1920 | Muncy | 114/240 E |
| 1,772,888 | A | * | 8/1930 | Elia | 114/241 |
| 2,369,464 | A | * | 2/1945 | Kalnitz | 114/240 R |
| 4,961,393 | A | * | 10/1990 | Murray | 114/240 R |
| 6,591,774 | B2 | * | 7/2003 | Metherell et al. | 114/241 |

OTHER PUBLICATIONS

Sales Brochure, ITA Industrial, a division of ITA Inc. for a Composite Harbor Protection Barrier, dated Dec. 16, 2002, 1 page.*

* cited by examiner

*Primary Examiner*—Lars A. Olson
(74) *Attorney, Agent, or Firm*—David S. Kalmbaugh

(57) ABSTRACT

A port security system comprising a continuous modular, floating barrier that is installed in lengths ranging from a few hundred feet to over a mile. The port security system is designed to stop high speed explosive laden waterborne craft traveling at speeds of fifty knots or greater from penetrating a military or commercial port. Each module of the port security system includes a capture net and net support structure which operates to stop the waterborne craft and prevent entry into the port.

31 Claims, 5 Drawing Sheets

PORT SECURITY BARRIER SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a port security barrier system which provides protection for military and commercial ports and ships docked at these ports. More particularly, the present invention relates to a floating barrier which utilizes nylon netting to prevent a small watercraft carrying explosives or the like from damaging a military or commercial port or ships docked at these ports.

2. Description of the Prior Art

There is currently a need to protect military ships from attack by explosive laden watercraft traveling at high rates of speed. Such explosive laden watercraft may include commercial power boats, small military craft and pleasure craft. These boats are generally less than forty feet in length, have a weight of around 10,000 pounds and travel at speeds of up to 52 knots. The small watercraft threat may be defined as watercraft which have a kinetic energy threshold of approximately $10^6$ lb-ft and are capable of achieving a kinetic energy of $2\times10^6$ lb-ft.

Port security barriers in the past have generally consisted of low freeboard float lines or log booms that mark a restricted area. However, these port security barriers are not capable of halting a deliberate attempt to penetrate the barrier There are also higher freeboard barriers fabricated molded plastic or inflated rubber tubes that will prevent penetration of watercraft of very limited size and speed into a port which harbors military ships including aircraft carriers, destroyers, supply and troop transport ships and the like. However this type of barrier is not effective as a deterrent to larger bomb laden watercraft operating at speeds of 50 kts or more.

Further, there is a need for a port security barrier which will survive wind, waves, currents, storms and other natural adverse conditions which occur at sea. Also, the port security barrier should be environmentally friendly, that is not dangerous to marine life and the marine environment including, for example, corral reefs.

SUMMARY OF THE INVENTION

The present invention overcomes some of the difficulties of the past, including those mentioned above in that it comprises a relatively simple in design and highly effective port security barrier which prevents bomb laden waterborne craft operating at speeds around 50 knots from entering a port for the purpose of disabling and seriously damaging military ships.

The port security system comprises a continuous modular, floating barrier that is installed in lengths ranging from a few hundred feet to over a mile. Each port security barrier module of the port security system includes a capture net fabricated from nylon or other synthetic line and net support structure which operates to stop the waterborne craft and prevent entry into the port.

Each port security barrier module of the port security system has three floating segmented pontoons to support the capture net and the net support structure. The pontoons are orientated perpendicular to the capture net and the barrier's longitudinal strength member which is the main support beam for the barrier.

Port security barrier modules for the port security system may be used as gates to allow small craft to pass through the system. By positioning the pontoons perpendicular to the main support beam drag is reduced when the gate is opened and closed.

Connector assemblies are provided which are used to connect adjacent port security modules to one another. Connector elements for the connector assemblies are positioned at each end of the longitudinal strength member for the module.

The port security system also has mooring buoys located along the length of the system to hold the system in place. Mooring buoys which are positioned approximately 100 to 500 feet apart have mooring lines and anchors attached thereto to secure the port security system in a fixed position with respect to the port.

DETAILED DESCRIPTION OF THE PREFERRED EMBODIMENT

Figures 1, 1A:
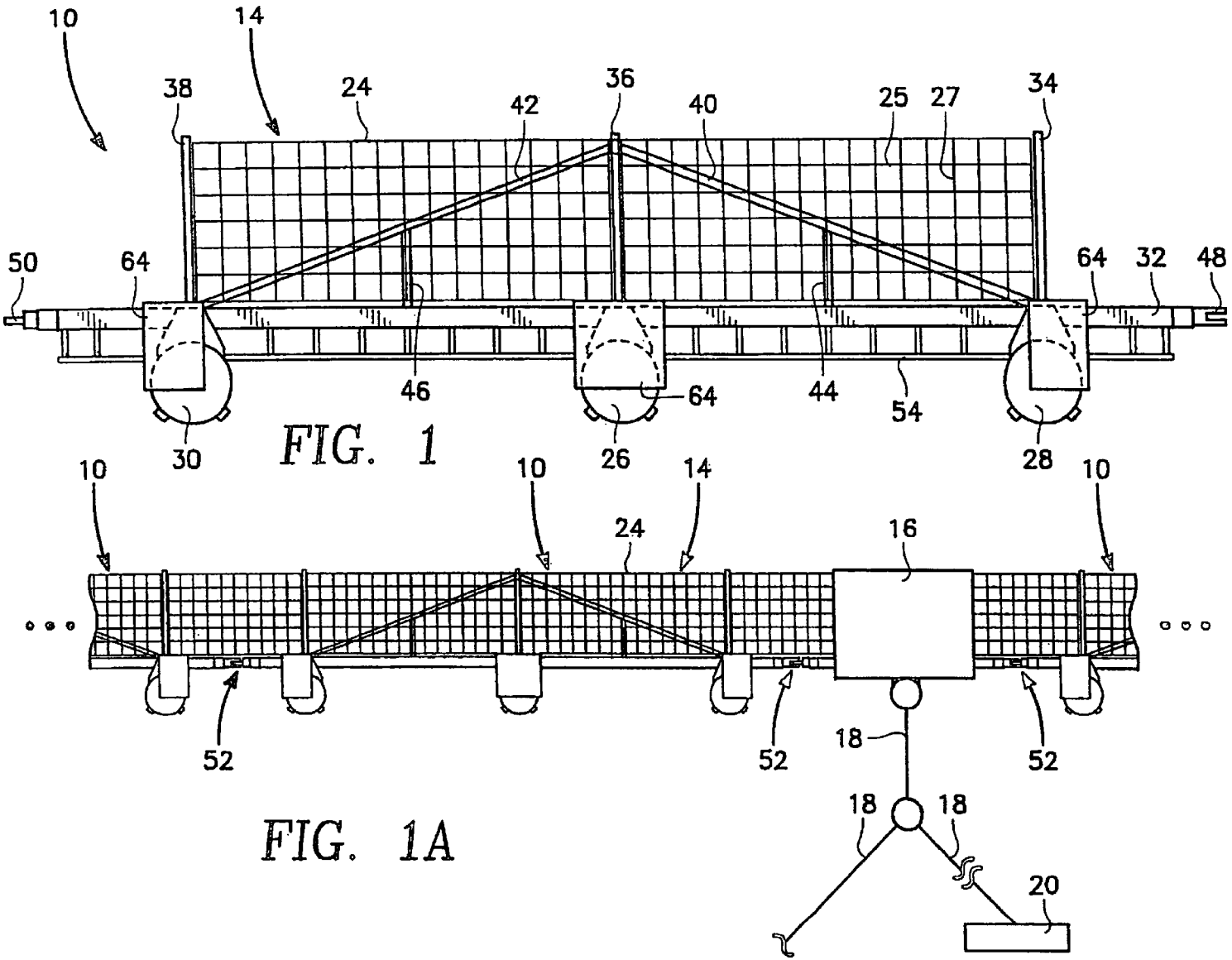
FIGS. 1 and 1A illustrate plan views of a preferred embodiment of the port security barrier comprising the present invention.
Figure 5:
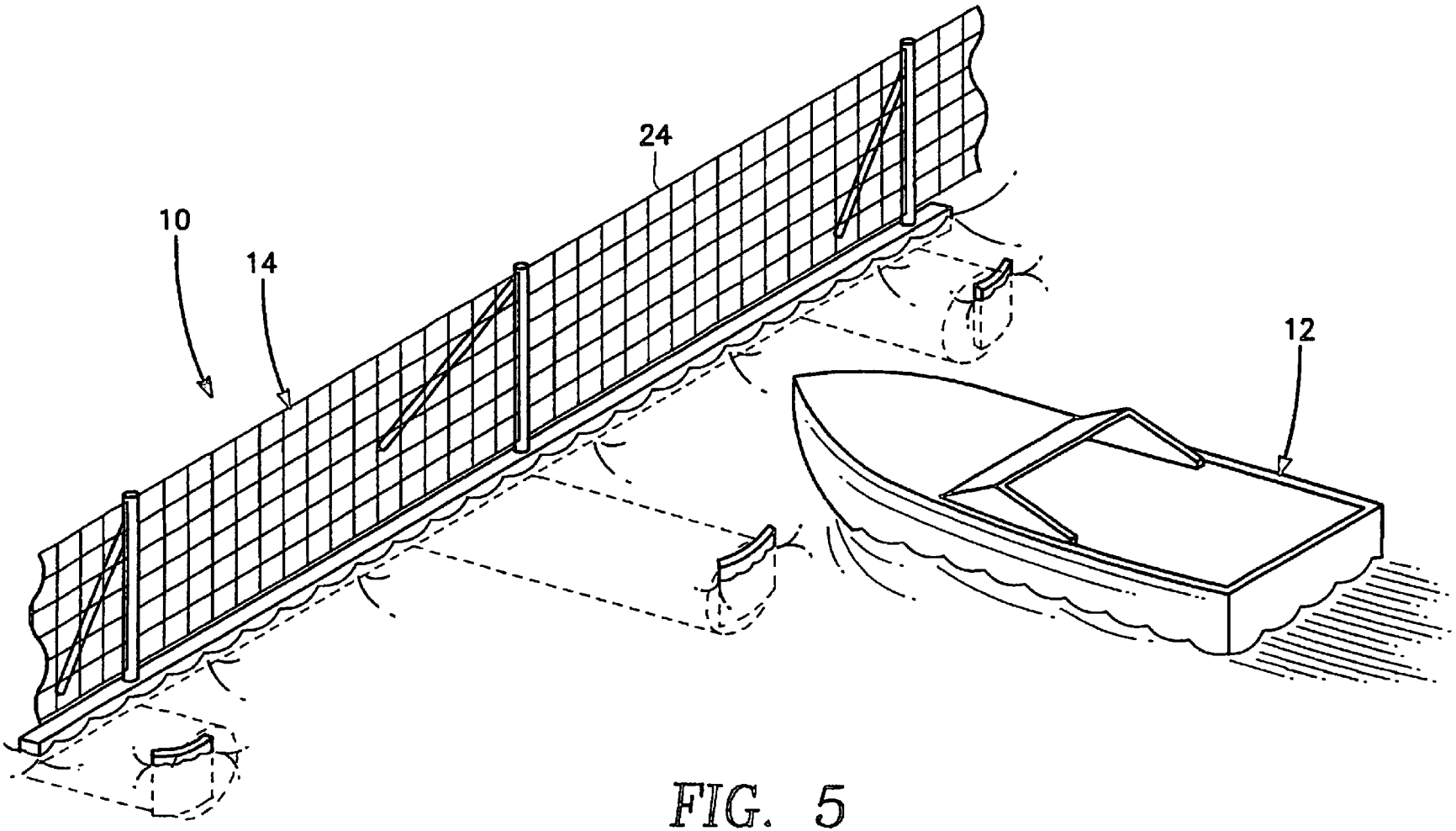
FIG. 5 is a perspective of a bomb laden high speed watercraft approaching the port security barrier of FIG. 1.
Figure 6:
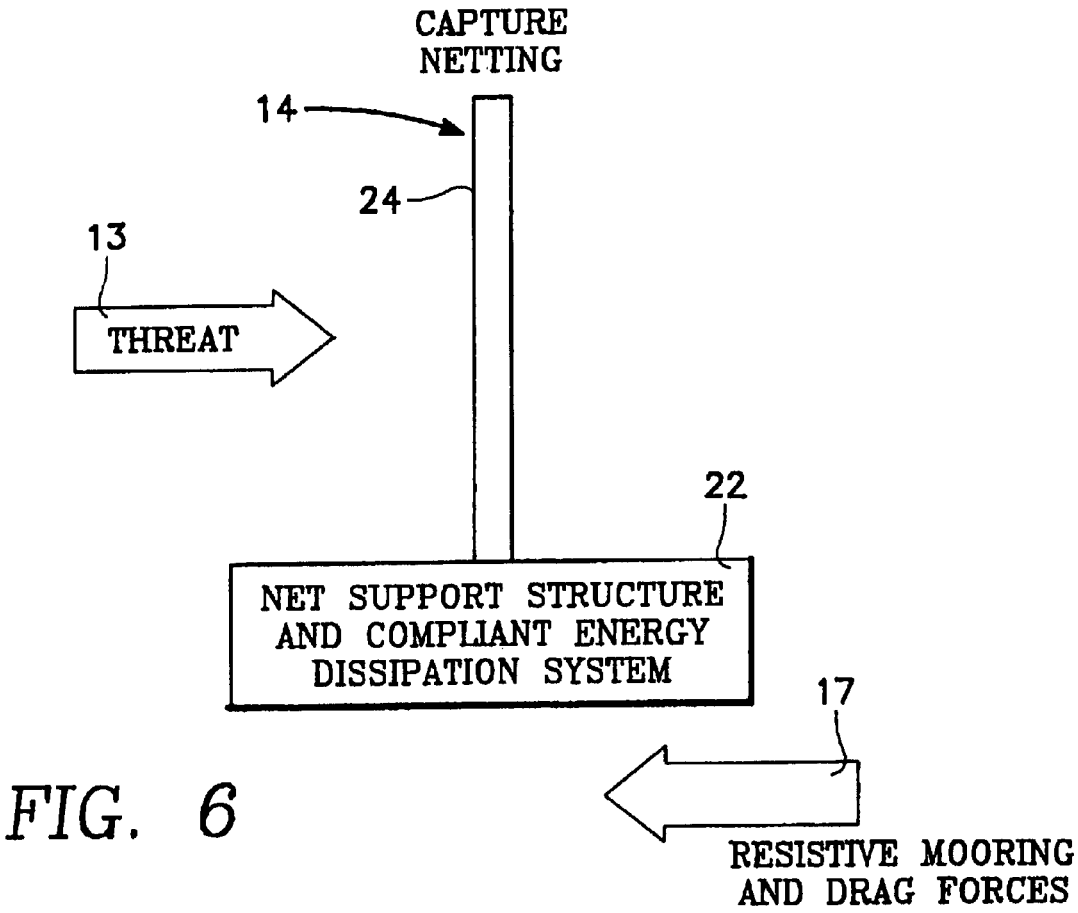
FIG. 6 is a block diagram illustration to the port security barrier of FIG. 1.
Figure 7:
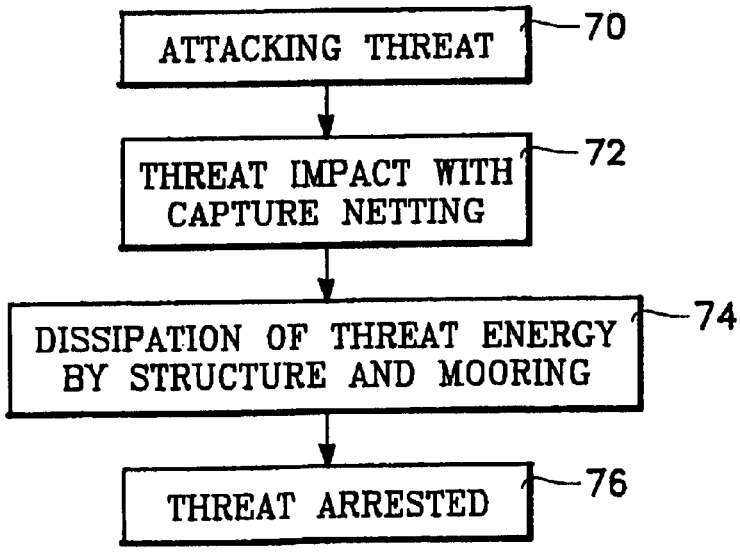
FIG. 7 is a block diagram illustrating the operation of the port security barrier of FIG. 1 as a bomb laden high speed watercraft engages the port security barrier.

Referring to FIGS. 1, 1A and 5, the port security barrier 10 comprises a floating segmented boat barrier, modular, floating barrier that is installed in lengths ranging from a few hundred feed (example, two hundred feet) to over a mile. Barrier 10 operates to a stop a hostile high speed waterborne craft 12 which is attempting to inflict heavy damages on a port facility and the military ships anchored at the facility. Arrow 13 indicates the direction waterborne craft 12 is traveling throughout the figures of the drawings.

The port security barrier 10 is assembled using the port security barrier modules 14 illustrated in FIG. 1, each of which is approximately 50 feed in length. The width of each port security module 14 is about 18 feet, the height is about 9.4 feet and the weight is approximately 8,000 to 8,500 pounds.

Figure 2:
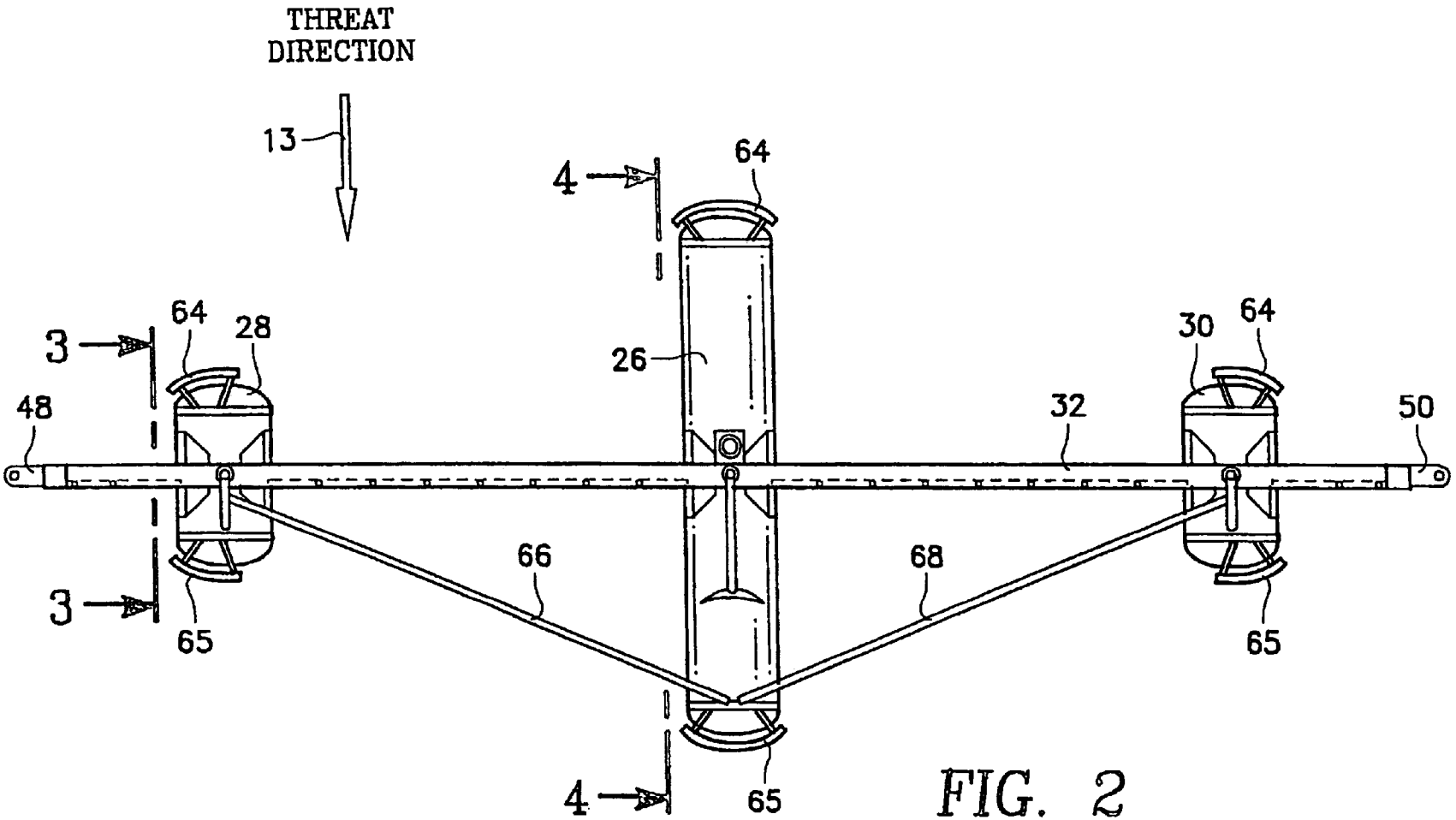
FIG. 2 illustrates a top view of the port security barrier of FIG. 1.

A mooring system [15] is also provided for the port security barrier 10. The mooring system [15] includes mooring buoys 16 which are positioned approximately 100 to 500 feet apart and their associated mooring lines 18 and anchors 20. As seen in FIG. 2 the mooring lines have a branch structure with each branch have an anchor 20 attached to the branch. The anchors 20 are fabricated from concrete for low maintenance and rest on the ocean floor.

When the port security barrier 10 is fully assembled, the barrier 10 constitutes a continuous wall for the port facility which it protects extending from a low point one foot above water to a point no less than eight feet above water.

Each port security module 14 of port security barrier 10 has a support structure 22 and a capture net 24 with capture net 24 being attached to the support structure 22. The horizontal boat stopping members 25 of capture net 24 consist of a 1.125 inch diameter 12-Strand Braided nylon rope. The vertical stopping members 27 of capture net 24 consist of 0.75 inch diameter 12-Plait nylon.

Nylon was selected as the netting because of its ability to absorb energy from an attacking watercraft 12 after it is trapped by the capture net 24. Other materials which may used as netting for the port security barrier 10 may include, for example, polyester, Kevlar and Spectra. The capture net 24 has a mesh size of one foot square and extends eight feet above the still water line. The netting comprising capture net 24 is provided in lengths of 52 feet which will span over one port security barrier module 14. The overall height of capture net 24 is eight feet above water level which is higher than the bow of most small high speed watercraft. Net slack of approximately 1.5 feet is provided between adjacent port security barrier modules 14 to allow for relative motion of the port security barrier 10 caused by tide, waves and currents of the ocean. Shock cord is used to keep netting tight between adjacent modules 14.

Capture net 24 is coated to resist ultra-violet damage and increase net life.

Modules 14 adjacent to gates for port security barrier 10 have 81 foot long boat-stopping nets to provide additional stretch to improve their boat stopping ability. Small boat gates for the port security barrier 10 generally comprise a single port security barrier module 14, an underwater sinker pipe (not shown), a chain (not shown) and a pair of mooring buoys 16. Module 14 operates as a small boat gate attached to the mooring buoys with connector assemblies 52, which are directed in FIG. 1A. The pipe sinker and chain which are attached to the mooring buoys 16 provide a "back stay" mooring leg that keeps the barrier in place when the small boat gate is open.

Figure 3:
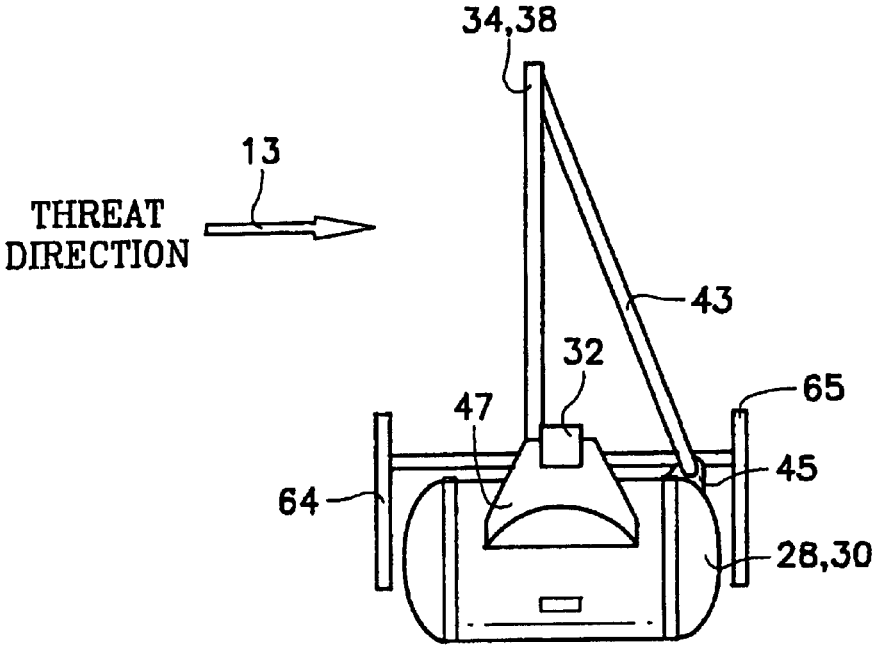
FIGS. 3 and 4 illustrate side views of the support structure for the port security barrier of FIG. 1.

Referring to FIGS. 1 and 3 the support structure 22 for each module 14 includes a centrally located pontoon 26 and a pair of end pontoons 28 and 30 each of which is positioned perpendicular to the longitudinal strength member 32 for each module 14. Pontoon 26 which has an overall length of approximately 18 feet and a diameter of 3.5 feet is located at the center of module 14, 25 feet from each end of module 14. Pontoons 28 and 30 each have an overall length of 6 feet and a diameter of 3.5 feet and are positioned 6 feet, 6 inches from their associated ends of module 14.

Pontoons 26, 28 and 30 are designed so that the water level is at approximately mid-pontoon level. Orientating the pontoons perpendicular to longitudinal strength member 32 reduces drag on port security barrier 10 when gates for port security barrier system 10 are either opened or closed. Pontoon 26 is longer than pontoons 28 and 30 to provide the buoyancy required for floatation of module 14 and to provide resistance to capsizing of module 14 in the roll direction. Pontoons 28 and 30 are shorter than pontoon 26 to: (1) reduce interference when gates are opened; (2) reduce the righting moment in the pitch direction thereby improving the operational performance of module 14 in heavy waves; and (3) reduce the resistance of module 14 to end-on-currents. Pontoons 26, 28 and 30 are fabricated from steel which is painted to help protect the pontoons from the corrosives effects of seawater.

For cathodic protection of the pontoons, anodes may be attached to the pontoons to protect the steel. Composite materials may also be used to fabricate the pontoons and protect the pontoons from corrosion caused by seawater.

Figure 4:
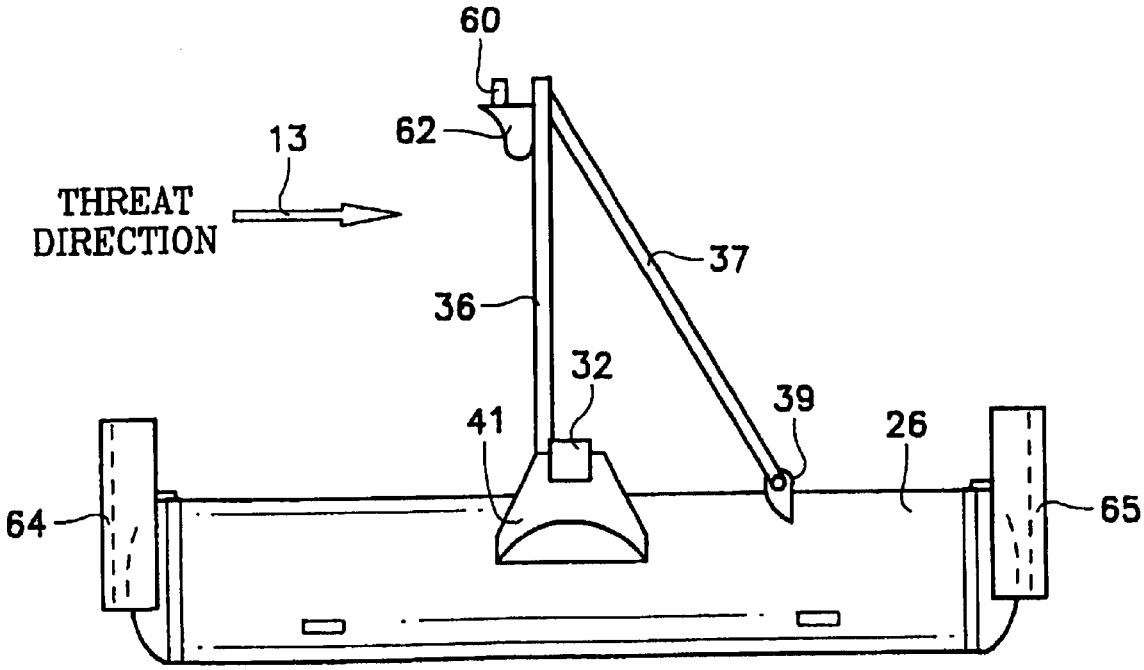

Referring to FIGS. 1, 3 and 4, the net support structure 22 for net 24 includes net support members 34, 36 and 38 which are positioned perpendicular to longitudinal strength member 32 extending vertically upward therefrom. Net support member 34 and 38 are positioned approximately 6 feet 6 inches from their respective ends of port security barrier 10 while net support member 36 is positioned at the center of barrier 10 twenty five feet from each end of barrier 10.

Support structure 22 includes a pair of angled support braces 40 and 42. Angled support brace 40 has its lower end attached to net support member 34 near the bottom end of net support member 34 and its upper end attached to net support member 36 near the top end of net support member 36. In a like manner, angled support brace 42 has its lower end attached to net support member 38 near the bottom end of net support member 38 and its upper end attached to net support member 36 near the top end of net support member 36.

Net support structure 22 also has a pair of support members 44 and 46 which are positioned perpendicular to longitudinal strength member 32 extending vertically upward therefrom. Support member 44 is located midway between net support member 34 and net support member 36, while support member 46 is located midway between net support member 38 and net support member 36.

As shown in FIG. 1 support member 44 has its lower end attached to longitudinal strength member 32 and its upper end attached to angled support brace 40. Likewise, support member 44 has its lower end attached to longitudinal strength member 32 and its upper end attached to angled support brace 42.

It should be noted that the components of net support structure are fabricated from extra thick wall pipe and painted on the inside and outside to resist corrosion and reduce maintenance.

At this time, it should also be noted that net support members 44 and 46 may be lengthened such that their height will be approximately the same as the height of members 34, 36 and 38. This, in turn, will result in a substantially rigid support structure for net 14. In the preferred embodiment of the present invention, the approximate height of net support members 34, 36 and 38 is 5 feet 9 inches. Net 24 is secured to the net support structure 22 including net support members 34, 36 and 38 by shackles. Shackles are also used between adjacent port security barrier modules 14 to connect their nets.

Net support structure 22 may be modified to allow for a secondary net which extends from 8 feet above the water level to 14 feet above the water level. Extending the length of support members 34, 36 and 38 as well as support members 44 and 46 and providing additional bracing will provide a means of support for the secondary netting.

Referring now to FIGS. 1, 2, 3 and 4, FIG. 3 illustrates a side view of one of the end pontoons 28 or 30 and support structure for capture net 24, while FIG. 4 illustrates a side view of the centrally located pontoon 26 and support structure for capture net 24.

As shown in FIG. 3, net support members 34 and 38 each have one end of an angled support brace 43 attached to their upper end. The other end of each support brace 43 for members 34 and 38 is secured to pontoon 28 and pontoon 30 by a bracket 45 mounted on the top side of pontoons 28 and 30. Each support brace 43 forms an angle of approximately 22.2° with its net support member 34 or 38. A net structure support base 47 is also mounted on the top side of pontoon 28 and 30. The support base 47 for pontoon 28 and the support 47 for pontoon 30 secures longitudinal strength member 32 to pontoons 28 and 30. Support base 47 for pontoon 28 is utilized to mount net support member 38 on pontoon 28, while support base 47 for pontoon 30 is utilized to mount net support member 38 on pontoon 30.

As shown in FIG. 4, net support member 36 has one end of an angled support brace 37 attached to its upper end. The other end of support brace 37 is secured to pontoon 26 by a bracket 39 mounted on the top side of pontoon 26. Support brace 37 forms an angle of approximately 30° with net support member 36. A net structure support base 41 is also mounted on the top side of pontoon 26. Support base 41 secures longitudinal strength member 32. Support base 41 for pontoon 26 is utilized to mount support member 36 on pontoon 26.

Located at the ends of longitudinal strength member 32 are connector element 48 and 50. Connector elements 48 and 50 are elements of a port security barrier connector assembly 52 which allows multiple port security barrier modules 14 to be connected in the manner illustrated in FIG. 1A to form port security barrier 10. Port security barrier connector assembly 52 is designed to be effective in compression as well as tension to prevent impact between adjacent port security barrier modules 14, and connector assembly 52 incorporates a disk spring for shock mitigation. The connector assembly 52 is also easy to install and disconnect and is resistant to the corrosive effects of seawater.

Positioned below and attached to longitudinal strength member 32 is an anti-kayak guard 54 which prevents small craft such as a canoe or kayak from slipping under port security barrier 10. Located near the top of net support member 36 is a warning light 60 which is mounted on a light support bracket 62 attached to net support member 36. Pontoons 26, 28 and 30 may have fenders/protective plates 64 affixed to their front end as shown in FIGS. 3 and 4 to prevent damage to the pontoons from waterborne craft 12 traveling in the direction of arrow 13. Fenders 65 as shown in FIG. 2 may also be attached to the rear end of pontoons 26, 28 and 30 to prevent damage ships which may approaching port security barrier 10 in the direction opposite arrow 13.

Each port security barrier module 14 also has a pair of towing braces 68 and 70 which provide stability for the module 14 when the module 14 is being towed at sea. One end of towing brace 68 and towing brace 70 is attached to the rear end of pontoons 26. The opposite end of towing brace 66 is attached to pontoon 28 and the opposite end of towing brace 68 is attached to pontoon 30.

Referring now to FIGS. 1, 1A, 5, 6 and 7, FIG. 7 illustrates in a block format the operation of port security barrier 10 in stopping an explosive laden waterborne craft 12 from penetrating a port facility. The waterborne craft 12 approaches the port facility at a high rate of spped which may exceed fifty knots. The waterborne craft 12 is laden with explosives and is attempting to inflict severe damage on ships docked at the port facility (block 70 of FIG. 7). The kinetic energy of craft 12 is absorbed by the elasticity of the capture net 24, hydrodynamic drag 17 of the supporting structure for each port security barrier modules 14 and compliance of the mooring system [15] (blocks 72 and 74 of FIG. 7). The energy of the craft [15] *12* is dissipated over a distance that is adjustable and the craft [15] *12* is arrested before the craft can inflict harm on the port facility (block 76 of FIG. 7). Changing the stiffness of net 14 and mooring system [15] adjust the distance to arrest craft 12. As the components of each port security barrier modules 14 are stiffened the distance required to stop a threat is reduced, however the size and strength of the barrier components must be increased.

From the foregoing it may readily be seen that the present invention comprises an new, unique and exceedingly useful port security barrier system which provides protection for military and commercial ports which constitutes a considerable improvement over the known prior art. Obviously, many modifications of the present invention are possible in light of the above teachings. It is therefore to be understood that within the scope of the appended claims that the invention may be practiced otherwise than as specifically described.

What is claimed is:

1. A port security barrier system for protecting a port facility from a waterborne craft laden with explosives, said port security barrier system comprising:

(a) a plurality of port security barrier modules connected to one another to form a floating security barrier for said port facility having a length from about two hundred feet to about one mile;

(b) a plurality of mooring buoys, each of said plurality of mooring buoys being disposed between an adjacent pair of said port security barrier modules and connected to each of the adjacent pair of said port security barrier modules, said mooring buoys maintaining said port security barrier modules in a fixed position relative to said port facility to insure that said port facility is protected from said waterborne craft;

(c) each of said port security barrier modules including:

(i) a longitudinal strength member;

(ii) a generally rectangular shaped capture net extending vertically upward from said longitudinal strength member, said capture net having a length approximately the same as the length of said longitudinal strength member, and a height which is sufficient to prevent said waterborne craft from penetrating said port facility;

(iii) a net support structure extending vertically upward from said longitudinal strength member, said net support structure being attached to said longitudinal strength member, said net support structure having said capture net attached thereto;

(iv) a plurality of pontoons attached to said longitudinal strength member and orientated perpendicular to said longitudinal strength member, said pontoons for each of said port security barrier modules keeping said port security barrier system afloat in a seawater environment; and (v) an anti-kayak guard positioned below and attached to said longitudinal strength member, said anti-kayak guard preventing small watercraft from slipping under said port security barrier system into said port facility.

2. The port security barrier system of claim 1 wherein each of said plurality of mooring buoys has one end of a mooring line connected thereto, said mooring line having at least two branches, each of the branches of said mooring line having an anchor connected thereto.

3. The port security barrier system of claim 1 wherein said capture net has a mesh structure, said mesh structure having a one foot square mesh size comprising horizontal boat stopping members consiting of a 1.125 inch diameter 12-Strand Braided nylon rope and vertical boat stopping members consisting of 0.75 inch diameter 12-Plait nylon, the horizontal boat stopping members of said capture net being interlaced with the vertical boat stopping members of said capture net to form the mesh structure of said capture net.

4. The port security barrier system of claim 3 wherein said capture net has a height of approximately eight feet and a width of approximately fifty two feet.

5. The port security barrier system of claim 3 wherein said capture net is fabricated from nylon to absorb energy from a waterborne craft which engages said capture net, said waterborne craft when engaging said capture net traveling at speeds of up to 52 knots and having a weight of around 10,000 pounds.

6. The port assembly barrier system of claim 1 wherein said plurality of pontoons comprise three pontoons, a first and a second of said three pontoons being positioned at each end of said longitudinal strength member and a third of said three pontoons being position at the center of said longitudinal strength member, the first and the second of said three pontoons having an equal length, and the third of said three pontoons having a substantially greater length than the first and the second of said three pontoons.

7. The port security barrier system of claim 1 wherein said longitudinal strength member includes connector elements positioned at each end of said longitudinal strength member, said connector elements allowing a user of said port security barrier system to connect each of said port security barrier modules to adjacent port security barrier modules.

8. The port security barrier system of claim 7 wherein one of said port security barrier modules operates as a gate, the connector elements of the one of said port security barrier modules operating as said gate allowing said user to open and close the one of said port security barrier modules operating as said gate.

9. The port security barrier system of claim 1 wherein said net support structure comprises:

first, second and third net support member attached to said longitudinal strength member, said first, second and third net support members extending vertically upward from said longitudinal strength member, said first net support member being positioned at one end of said longitudinal strength member, said second net support member being positioned at other end of said longitudinal strength member and said third net support member being positioned at the center of said longitudinal strength member;

a first angled support brace, said first angled support brace having one end attached to the bottom end of said first net support member and the other end attached near the top end of said third net support member; and a second angled support brace, said second angled support brace having one end attached to the bottom end of said second net support member and the other end attached near the top end of said third net support member.

10. The port security barrier system of claim 9 further comprising a warning light located near the top end of said third net support member and a light support bracket attached to said net support member, [said light support bracket being mounted on said light support bracket] *said warning light being mounted on said light support bracket*.

11. The port security barrier system of claim 9 further comprising:

a third angled support brace having one end attached to the top end of said first net support member and the other end attached to a first of said plurality of pontoons;

a fourth angled support brace having *one* end attached to the top end of said second net support member and the other end attached to a second of said plurality of pontoons; and a fifth angled support brace having *one* end attached to the top end of said third net support member and the other end attached to a third of said plurality of pontoons.

12. A port security barrier system for protecting a port facility from a waterborne craft laden with explosives, said port security barrier system comprising:

(a) a plurality of port security barrier modules connected to one another to form a floating security barrier for said port facility having a length from about two hundred feet to about one mile;

(b) a plurality of mooring buoys, each of said plurality of mooring buoys being disposed between an adjacent pair of said port security barrier modules and connected to each of the adjacent pair of said port security barrier modules, said mooring buoys maintaining said port security barrier modules in a fixed position relative to said port facility to insure that said port facility is protected from said waterborne craft;

(c) each of said port security barrier modules including:

(i) a longitudinal strength member;

(ii) a generally rectangular shaped capture net extending vertically upward from said longitudinal strength member, said capture net having a length approximately the same as the length of said longitudinal strength member, and a height which is sufficient to prevent said waterborne craft from penetrating said port facility, said capture net having a mesh structure, said mesh structure having a one foot square mesh size comprising horizontal boat stopping members consisting of a 1.125 inch diameter 12-Strand Braided nylon rope and vertical boat stopping members consisting of 0.75 inch diameter 12-Plait nylon, the horizontal boat stopping members of said capture net being interlaced with the vertical boat stopping members of said capture net to form the mesh structure of said capture net;

(iii) a net support structure extending vertically upward from said longitudinal strength member, said net support structure being attached to said longitudinal strength member, said net support structure having said capture net attached thereto;

(iv) a first pontoon, a second pontoon and a third pontoon orientated perpendicular to said longitudinal strength member and attached thereto, said first pontoon being positioned at each one end of said longitudinal strength member, said second pontoon being positioned at the opposite end of said longitudinal strength member and said third pontoon being position at the center of said longitudinal strength member, said first pontoon and said second pontoon having an equal length, and said third pontoon having a substantially greater length than said first pontoon and said second pontoon, said first pontoon, said second pontoon and said third pontoon for each of said port security barrier modules keeping said port security barrier system afloat in a seawater environment; and (v) an anti-kayak guard positioned below and attached to said longitudinal strength member, said anti-kayak guard preventing small watercraft from slipping under said port security barrier system into said port facility.

13. The port security barrier system of claim 12 wherein each of said plurality of mooring buoys has one end of a mooring line connected thereto, said mooring line having at least two branches, each of the branches of said mooring line having an anchor connected thereto.

14. The port security barrier system of claim 12 wherein said capture net has a height of approximately eight feet and a width of approximately of fifty two feet.

15. The port security barrier system of claim 12 wherein said capture net is fabricated from nylon to absorb energy from a waterborne craft which engages said capture net, said waterborne craft when engaging said capture net traveling at speeds of up to 52 knots and having a weight of around 10,000 pounds.

16. The port security barrier system of claim 12 wherein said longitudinal strength member includes connector elements positioned at each end of said longitudinal strength member, said connector elements allowing a user of said port security barrier system to connect each of said port security barrier modules to adjacent port security barrier modules.

17. The port security barrier system of claim 16 wherein one of said port security barrier modules operates as a gate, the connector elements of the one of said port security barrier modules operating as said gate allowing said user to open and close the one of said port security barrier modules operating as said gate.

18. The port security barrier system of claim 12 wherein said net support structure comprises:

first, second and third net support members attached to said longitudinal strength member, said first, second and third net support members extending vertically upward from said longitudinal strength member, said first net support member being positioned at one end of said longitudinal strength member, said second net support member being positioned at other end of said longitudinal strength member and said third net support member being positioned at the center of said longitudinal strength member;

a first angled support brace, said first angled support brace having one end attached to the bottom end of said first net support member and the other end attached near the top end of said third net support member;

a second angled support brace, said second angled support brace having one end attached to the bottom end of said second net support member and the other end attached near the top end of said third net support member;

a third angled support brace having one end attached to the top end of said first net support member and the other end attached to said first pontoon;

a fourth angled support brace having *one* end attached to the top end of said second net support member and the other end attached to said second pontoon; and a fifth angled support brace having *one* end attached to the top end of said third net support member and the other end attached to said third pontoon.

19. The port security barrier system of claim 18 further comprising a warning light located near the top end of said third net support member and a light support bracket a attached to said net support member, [said light support bracket being mounted on said light support bracket] *said warning light being mounted on said light support bracket*.

20. The port security barrier system of claim 12 wherein each of said port security barrier modules has a tow brace assembly for providing stability for said port security barrier module when said port security barrier module is being towed at sea, said port security barrier module having first and second towing braces, said first towing brace having one end attached to the center of said first pontoon and the opposite end attached to the rear of said third pontoon and said second towing brace having one end attached to the center of said second pontoon and the opposite end attached to the rear of said third pontoon.

*21. A port security barrier system for protecting a port facility from a waterborne craft laden with explosives, said port security barrier system comprising:*

*(a) a plurality of port security barrier modules connected to one another to form a floating security barrier for said port facility having a length from about two hundred feet to about one mile;*

*(b) a plurality of mooring buoys, each of said plurality of mooring buoys being disposed between an adjacent pair of said port security barrier modules and connected to each of the adjacent pair of said port security barrier modules, said mooring buoys maintaining said port security barrier modules in a fixed position relative to said port facility to insure that said port facility is protected from said waterborne craft;*

*(c) each of said port security barrier modules including:*

*(i) a longitudinal strength member;*

*(ii) a generally rectangular shaped capture net extending vertically upward from said longitudinal strength member, said capture net having a length approximately the same as the length of said longitudinal strength member, and a height which is sufficient to prevent said waterborne craft from penetrating said port facility;*

*(iii) a net support structure extending vertically upward from said longitudinal strength member, said net support structure being attached to said longitudinal strength member, said net support structure having said capture net attached thereto; and*

*(iv) a plurality of pontoons attached to said longitudinal strength member and orientated perpendicular to said longitudinal strength member, said pontoons for each of said port security barrier modules keeping said port security barrier system afloat in a seawater environment.*

*22. The port security barrier system of claim 21 wherein each of said plurality of mooring buoys has one end of a mooring line connected thereto, said mooring line having at least two branches, each of the branches of said mooring line having an anchor connected thereto.*

*23. The port security barrier system of claim 21 wherein said capture net has a mesh structure, said mesh structure having a one foot square mesh size comprising horizontal boat stopping members consisting of a 1.125 inch diameter 12-Strand Braided nylon rope and vertical boat stopping members consisting of 0.75 inch diameter 12-Plait nylon, the horizontal boat stopping members of said capture net being interlaced with the vertical boat stopping members of said capture net to form the mesh structure of said capture net.*

*24. The port security barrier system of claim 23 wherein said capture net has a height of approximately eight feet and a width of approximately fifty two feet.*

*25. The port security barrier system of claim 23 wherein said capture net is fabricated from nylon to absorb energy from a waterborne craft which engages said capture net, said waterborne craft when engaging said capture net traveling at speeds of up to 52 knots and having a weight of around 10,000 pounds.*

*26. The port security barrier system of claim 21 wherein said plurality of pontoons comprise three pontoons, a first and a second of said three pontoons being positioned at each end of said longitudinal strength member and a third of said three pontoons being position at the center of said longitudinal strength member, the first and the second of said three*

*pontoons having an equal length, and the third of said three pontoons having a substantially greater length than the first and the second of said three pontoons.*

*27. The port security barrier system of claim 21 wherein said longitudinal strength member includes connector elements positioned at each end of said longitudinal strength member, said connector elements allowing a user of said port security barrier system to connect each of said port security barrier modules to adjacent port security barrier modules.*

*28. The port security barrier system of claim 27 wherein one of said port security barrier modules operates as a gate, the connector elements of the one of said port security barrier modules operating as said gate allowing said user to open and close the one of said port security barrier modules operating as said gate.*

*29. The port security barrier system of claim 21 wherein said net support structure comprises:*

*first, second and third net support members attached to said longitudinal strength member, said first, second and third net support members extending vertically upward from said longitudinal strength member, said first net support member being positioned at one end of said longitudinal strength member, said second net support member being positioned at other end of said longitudinal strength member and said third net support member being positioned at the center of said longitudinal strength member;*

*a first angled support brace, said first angled support brace having one end attached to the bottom end of said first net support member and the other end attached near the top end of said third net support member; and*

*a second angled support brace, said second angled support brace having one end attached to the bottom end of said second net support member and the other end attached near the top end of said third net support member.*

*30. The port security barrier system of claim 29 further comprising a warning light located near the top end of said third net support member and a light support bracket attached to said net support member, said warning light being mounted on said light support bracket.*

*31. The port security barrier system of claim 29 further comprising:*

*a third angled support brace having one end attached to the top end of said first net support member and the other end attached to a first of said plurality of pontoons;*

*a fourth angled support brace having one end attached to the top end of said second net support member and the other end attached to a second of said plurality of pontoons; and*

*a fifth angled support brace having one end attached to the top end of said third net support member and the other end attached to a third of said plurality of pontoons.*

* * * * *